United States Patent
Olshansky et al.

(10) Patent No.: US 9,141,773 B2
(45) Date of Patent: *Sep. 22, 2015

(54) ZONE MIGRATION IN NETWORK ACCESS

(71) Applicant: NOMADIX, INC., Agoura Hills, CA (US)

(72) Inventors: Vadim Olshansky, Tarzana, CA (US); Raffaele Noro, Encino, CA (US)

(73) Assignee: NOMADIX, INC., Agoura Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/057,481

(22) Filed: Oct. 18, 2013

(65) Prior Publication Data

US 2014/0047514 A1    Feb. 13, 2014

Related U.S. Application Data

(63) Continuation of application No. 13/478,458, filed on May 23, 2012, now Pat. No. 8,566,912, which is a continuation of application No. 12/534,814, filed on Aug. 3, 2009, now abandoned.

(60) Provisional application No. 61/223,667, filed on Jul. 7, 2009.

(51) Int. Cl.
*G06F 21/30* (2013.01)
*H04L 12/46* (2006.01)
(Continued)

(52) U.S. Cl.
CPC ............ *G06F 21/30* (2013.01); *H04L 12/4641* (2013.01); *H04L 63/102* (2013.01); *H04L 63/107* (2013.01); *H04W 12/08* (2013.01); *H04W 84/12* (2013.01)

(58) Field of Classification Search
CPC . H04L 12/4641; H04L 63/102; H04L 63/107; G06F 21/30; H04W 12/08; H04W 84/12
USPC ............................................................ 726/4
See application file for complete search history.

(56) References Cited

U.S. PATENT DOCUMENTS 5,185,860 A    2/1993  Wu
5,293,488 A    3/1994  Riley (Continued)

FOREIGN PATENT DOCUMENTS

CN         1171704        1/1998
JP         10-105516 A    4/1998

(Continued)

OTHER PUBLICATIONS

Complaint filed Jan. 19, 2010, *Nomadix, Inc. v. SolutionInc Technologies Ltd.*, No. CV10-0381 (C.D. Cal. 2010).

(Continued)

*Primary Examiner* — Kambiz Zand
*Assistant Examiner* — Aubrey Wyszynski
(74) *Attorney, Agent, or Firm* — Knobbe Martens Olson & Bear, LLP

(57) ABSTRACT

The present disclosure is directed to providing a network user the ability to travel between different zones or locations within a network environment, such as, for example, a hospitality location, without requiring a user to re-login to the new location, while requiring a user to re-login to other locations within the network environment.

20 Claims, 7 Drawing Sheets

(51) Int. Cl.
*H04L 29/06* (2006.01)
*H04W 12/08* (2009.01)
*H04W 84/12* (2009.01)

(56) References Cited

U.S. PATENT DOCUMENTS

| | | |
|---|---|---|
| 5,678,041 A | 10/1997 | Baker |
| 5,699,520 A | 12/1997 | Hodgson |
| 5,745,481 A | 4/1998 | Phillips et al. |
| 5,835,061 A | 11/1998 | Stewart |
| 5,845,692 A | 12/1998 | Kellem et al. |
| 5,940,394 A | 8/1999 | Killian |
| 5,969,678 A | 10/1999 | Stewart |
| 6,064,674 A | 5/2000 | Doidge et al. |
| 6,115,545 A | 9/2000 | Melquist |
| 6,130,892 A | 10/2000 | Short et al. |
| 6,141,690 A | 10/2000 | Weiman |
| 6,173,322 B1 | 1/2001 | Hu |
| 6,194,992 B1 | 2/2001 | Short et al. |
| 6,240,533 B1 | 5/2001 | Siemmer |
| 6,256,307 B1 | 7/2001 | Salmonson |
| 6,259,405 B1 | 7/2001 | Stewart |
| 6,326,918 B1 | 12/2001 | Stewart |
| 6,377,990 B1 | 4/2002 | Slemmer et al. |
| 6,414,635 B1 | 7/2002 | Stewart et al. |
| 6,452,498 B2 | 9/2002 | Stewart |
| 6,453,353 B1 | 9/2002 | Win |
| 6,470,027 B1 | 10/2002 | Birrell |
| 6,470,386 B1 | 10/2002 | Combar et al. |
| 6,571,221 B1 | 5/2003 | Stewart |
| 6,574,664 B1 | 6/2003 | Liu |
| 6,584,505 B1 | 6/2003 | Howard |
| 6,636,894 B1 | 10/2003 | Short et al. |
| 6,697,018 B2 | 2/2004 | Stewart |
| 6,732,176 B1 | 5/2004 | Stewart |
| 6,738,382 B1 | 5/2004 | West |
| 6,751,677 B1 | 6/2004 | Ilnicki |
| 6,759,960 B2 | 7/2004 | Stewart |
| 6,760,416 B1 | 7/2004 | Banks et al. |
| 6,789,110 B1 | 9/2004 | Short et al. |
| 6,795,852 B1 | 9/2004 | Kleinrock et al. |
| 6,810,426 B2 | 10/2004 | Mysore et al. |
| 6,823,059 B2 | 11/2004 | Kalmanek |
| 6,834,341 B1 | 12/2004 | Bahl |
| 6,856,800 B1 | 2/2005 | Henry et al. |
| 6,857,009 B1 | 2/2005 | Ferreria et al. |
| 6,868,399 B1 | 3/2005 | Short et al. |
| 6,934,754 B2 | 8/2005 | West et al. |
| 6,950,628 B1 | 9/2005 | Meier et al. |
| 6,970,927 B1 | 11/2005 | Stewart |
| 6,996,073 B2 | 2/2006 | West |
| 7,003,578 B2 | 2/2006 | Kanada et al. |
| 7,007,080 B2 | 2/2006 | Wilson |
| 7,009,556 B2 | 3/2006 | Stewart |
| 7,016,960 B2 | 3/2006 | Howard et al. |
| 7,020,082 B2 | 3/2006 | Bhagavath et al. |
| 7,032,243 B2 | 4/2006 | Leerssen et al. |
| 7,058,594 B2 | 6/2006 | Stewart et al. |
| 7,072,056 B1 | 7/2006 | Greaves et al. |
| 7,080,077 B2 | 7/2006 | Ramamurthy |
| 7,088,727 B1 | 8/2006 | Short et al. |
| 7,117,526 B1 | 10/2006 | Short |
| 7,120,678 B2 | 10/2006 | Greuel |
| 7,126,915 B1 | 10/2006 | Lu |
| 7,194,554 B1 | 3/2007 | Short et al. |
| 7,197,556 B1 | 3/2007 | Short et al. |
| 7,216,152 B2 | 5/2007 | Short et al. |
| 7,240,106 B2 | 7/2007 | Cochran et al. |
| 7,269,653 B2 | 9/2007 | Mentze et al. |
| 7,336,960 B2 | 2/2008 | Zavalkovsky et al. |
| 7,349,982 B2 | 3/2008 | Hannum et al. |
| 7,356,841 B2 | 4/2008 | Wilson et al. |
| 7,376,113 B2 | 5/2008 | Taylor et al. |
| 7,428,413 B2 | 9/2008 | Fink |
| 7,472,191 B2 | 12/2008 | Stewart |
| 7,474,617 B2 | 1/2009 | Molen et al. |
| 7,493,084 B2 | 2/2009 | Meier et al. |
| 7,526,538 B2 | 4/2009 | Wilson |
| 7,536,714 B2 | 5/2009 | Yuan |
| 7,554,995 B2 | 6/2009 | Short et al. |
| 7,580,376 B2 | 8/2009 | West |
| 7,689,716 B2 | 3/2010 | Short et al. |
| 7,698,432 B2 | 4/2010 | Short et al. |
| 7,739,383 B1 | 6/2010 | Short et al. |
| 7,752,334 B2 | 7/2010 | Paunikar et al. |
| 7,822,873 B1 | 10/2010 | Paunikar et al. |
| 8,244,886 B2 | 8/2012 | Short et al. |
| 8,566,912 B2 * | 10/2013 | Olshansky et al. ............... 726/4 |
| 2002/0006788 A1 | 1/2002 | Knutsson et al. |
| 2004/0015572 A1 | 1/2004 | Kang |
| 2004/0203752 A1 | 10/2004 | Wojaczynski et al. |
| 2005/0143065 A1 | 6/2005 | Pathan et al. |
| 2005/0148342 A1 | 7/2005 | Sylvain |
| 2005/0260973 A1 | 11/2005 | van de Groenendaal |
| 2006/0089122 A1 | 4/2006 | Zavalkovsky et al. |
| 2006/0135155 A1 | 6/2006 | Chung et al. |
| 2007/0162598 A1 | 7/2007 | Gorodyansky |
| 2007/0271598 A1 | 11/2007 | Chein et al. |
| 2008/0148383 A1 | 6/2008 | Pitchaikani et al. |
| 2008/0271109 A1 | 10/2008 | Singh et al. |
| 2009/0024745 A1 | 1/2009 | Short et al. |
| 2010/0115113 A1 | 5/2010 | Short et al. |
| 2010/0208743 A1 | 8/2010 | Short et al. |
| 2010/0332615 A1 | 12/2010 | Short et al. |
| 2011/0030037 A1 | 2/2011 | Olshansky et al. |
| 2011/0035479 A1 | 2/2011 | Paunikar et al. |

FOREIGN PATENT DOCUMENTS

| | | |
|---|---|---|
| JP | 11-282804 A | 10/1999 |
| JP | 2007-282103 | 10/2007 |

OTHER PUBLICATIONS

Complaint filed Nov. 17, 2009, *Nomadix, Inc.* v. *Hewlett-Packard Co.*, No. CV09-8441 (C.D. Cal. 2009).

International Search Report and Written Opinion, mailed Mar. 1, 2011, relating to PCT/US2010-040971, filed Jul. 2, 2010 in 12 pages.

Maruyama et al., "*A secure LAN sockets system for everyone which need not modify existing DHCP clients*", Study Report of Information Processing Society of Japan, Jul. 16, 1999, vol. 99, No. 56, pp. 131-136.

Office Action in U.S. Appl. No. 12/534,814 mailed Dec. 23, 2011.

U.S. Appl. No. 09/458,602, filed Dec. 8, 1999.

U.S. Appl. No. 09/693512, filed Oct. 20, 2000.

U.S. Appl. No. 61/433,908, filed Jan. 18, 2011.

Agari et al., "IP Telephony Solution that Extends by Wireless IP Cellular Phone Use", Hitachi Hyoron, Jun. 2007 vol. 89, No. 6, pp. 48-51.

Murakami et al., "A Study and Implementation for Rights Management on Electric Documents using Location Information", 2005, p. 50.

Sakai et al., "Context-Aware Information Provision Based on Context-Handling Platform," The Institute of Electronics, Information and Communication Engineers, Technical Report of IEICE, Nov. 2004, pp. 13-18.

* cited by examiner

Zone Migration Settings ~401

Relogin after migration ☑ Enable ~403

Submit ~405

Zone-Based Migration

Add a new Zone: ~407

Zone Name: [          ]

Description: [          ] ~409

Port-Locations: [          ] ~411

(Example: 212-299,301,400-499)

Relogin within Zone: ⦿ Disabled ○ Enabled ~413
~415 ~417

Add Zone   Reset

Existing Zones: ~419

| Zone Name | Port-Locations | Relogin within Zone | Actions | |
|---|---|---|---|---|
| Guest Wired | 201-700 | Enabled | Edit | Delete |
| Guest Wireless | 801-1500 | Disabled | Edit | Delete |
| Lobby | 100-150 | Disabled | Edit | Delete |
| Meeting Room A | 1601-1700 | Disabled | Edit | Delete |

4 Zones are defined

FIG. 4

ZONE MIGRATION IN NETWORK ACCESS

CROSS-REFERENCE TO RELATED APPLICATIONS

The present application is a continuation of U.S. patent application Ser. No. 13/478,458, filed May 23, 2012, which claims priority to U.S. patent application Ser. No. 12/534,814, filed Aug. 3, 2009, which claims the benefit of priority to U.S. Provisional Patent Application No. 61/223,667, filed Jul. 7, 2009. The aforementioned applications are hereby incorporated by reference in its entirety.

FIELD OF THE INVENTION

The present disclosure relates to the field of providing computer network access.

BACKGROUND

The use of laptop, cell phone, PDA and other mobile computing devices has become very common. Travelers, and particularly business travelers, expect and often require network access, such as access to the Internet, as they travel from one place to the next. Similarly, students in schools and doctors in hospitals require access throughout their respective campuses or medical buildings. Even in a single venue, such as a hotel or conference center, travelers and guest desire network access at various locations throughout the venue including guest rooms, restaurants, meeting rooms, lobby, business centers, etc.

SUMMARY

The present disclosure is directed to providing a system for controlling network access in different physical locations of a network. In an embodiment, the disclosure describes a system for controlling access in a network for user moving between different physical locations of the network. For example, in an embodiment, when a user moves between different rooms in a particular venue, the system implements rules which establish when the user will be automatically authenticated to the new location, or whether a new authentication is necessary.

In an embodiment, network access is controlled by implementing different authentication rules for different network access points. A network access point is any wired or wireless connection point to a network. In an embodiment, a network access point is a wired or wireless port. Ports can include, for example, 802.1Q VLAN IDs or the like, TCP ports or the like, UDP ports or the like, and any other software defined communication endpoints. In an embodiment, a network access point is a physical connection to the network, such as, for example, an Ethernet jack, a phone jack, a wireless router, or the like. An access point can also include any form of location identification, such as, for example, the triangulation of a wireless signal, the use of a global positioning system (GPS), or any other system for determining the location of a network user.

In an embodiment, access points are grouped into zones. In an embodiment, a zone includes one or more access points. In an embodiment, a network includes at least a plurality of zones. In an embodiment, a network administrator can configure access rules for allowing a user to move between access points within a zone and/or between zones. In an embodiment, for example, a user is allowed to move from access point to access point within a zone without having to re-authenticate. However, a user may be required to re-authenticate when moving between access points associated with different zones. This can be useful, for example, when a user is required to pay different amounts to access the network through access points in different zones or where different zones have different security levels associated with them. As used in the present specification, authentication can include, for example, a login, including a user name and/or password, the payment of a fee, the registration of a computer, entering a passcode or any other affirmative action taken by a user of a user device to gain permission to use a network.

For purposes of summarizing the disclosure, certain aspects, advantages and novel features of the inventions have been described herein. It is to be understood that not necessarily all such advantages can be achieved in accordance with any particular embodiment of the inventions disclosed herein. Thus, the inventions disclosed herein can be embodied or carried out in a manner that achieves or optimizes one advantage or group of advantages as taught herein without necessarily achieving other advantages as can be taught or suggested herein.

BRIEF DESCRIPTION OF THE DRAWINGS

The drawings are provided to illustrate embodiments of the inventions described herein and not to limit the scope thereof.

FIG. 4 illustrates an administrator setup screen for defining a plurality of access zones.

DETAILED DESCRIPTION

Figure 1:
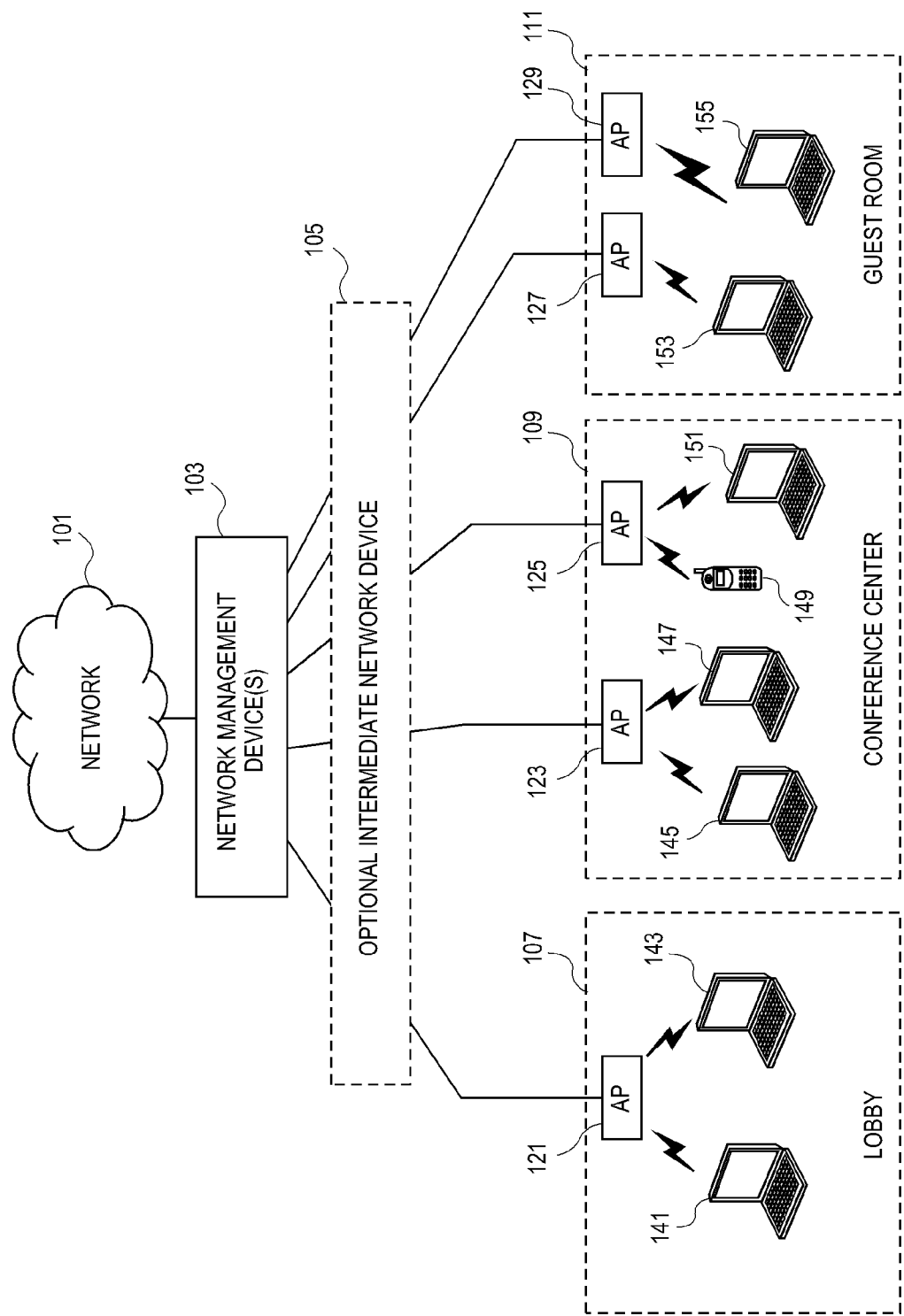
FIG. 1 schematically illustrates an embodiment of a network.

FIG. 1 schematically illustrates an embodiment of a network access system. The system includes various user devices 141, 143, 145, 147, 149, 151, 153, 155. User devices can include, such as, for example, laptops, desktop computers, cell phones, PDAs and any other wired or wireless network enabled communication devices. The user devices 141, 143, 145, 147, 149, 151, 153, 155 communicate with access points 121, 123, 125, 127, 129. Access points 121, 123, 125, 127, 129 provide wired or wireless communications with network management device(s) 103. The network management device(s) 103 controls network communications in-between access points and between the access points and network 101. In an embodiment, the network management device(s) are operated by a single entity. In an embodiment, the network management device(s) create a single network. Optionally, intermediate network devices 105 can also be used, including, for example, routers, switches, hubs, repeaters, etc. to assist in providing communications between access points 121, 123, 125, 127 and network management device(s) 103. The network 101 can be, for example, a public network such as the Internet. Network management device(s) 103 can include network gateways, such as, for example, network access gateways commercially available from Nomadix, Inc. of Newbury Park, Calif. As will be understood by those of skill in the art from the present disclosure, other network management devices can also be used. As illustrated in FIG. 1, the network includes three different physical areas including lobby 107, conference center 109 and guest room 111. Each physical area includes one or more access points.

The network management device(s) 103 provide the ability to group the access points together for purposes of allowing a user device to move between certain access points without requiring re-authentication while requiring re-authentication when moving to other access points. The grouping of access points can be made, for example, along physical boundaries such as, for example, a wall. This can be done, for example, by allocating certain access points to a defined zone. In an embodiment, a zone is a room, group of rooms, building, group of buildings or the like. For example, the lobby 107 can be a first zone, the conference center 109 can be a second zone and the guest room 111 can be a third zone. In a simple example, a user device will be able to move between access points within a zone without having to re-authenticate, but will be required to re-authenticate when moving between access points located in different zones. Authentication, can include, for example, a login, payment of fees, a request for access, entry of a code, or any other action required by the user to request access to the network. In another example, a user device, once authenticated to the lobby zone 107 can be allowed to access the conference center zone 109 without reauthentication, but may be required to re-authenticate when moving to the guest room zone 111.

In an embodiment, access points advertise their presence by broadcasting a Service Set Identifier (SSID), Extended Service Set Identifier (ESSID), and/or Basic Service Set Identifier (BSSID), or the like, collectively referred to herein as SSID. In an embodiment, the same SSID is assigned to all access points and zones in a network. In an embodiment, a different SSID is assigned to each zone or to a group of zones. In an embodiment, multiple SSID's can be assigned to the same zone or same set of access points. In this respect virtual SSID's can be set up corresponding to different groupings of zones or access points. For example, at the same hotel or conference center, two different conferences which are simultaneously occurring can have custom SSID's corresponding to the access grated to each group. Conference A2 2009 for example can have a custom SSID entitled "Conference A2 2009" which allows access to access points in the Lobby, Guest Rooms and Meeting Rooms without re-authentication, but not in the Business Center. A second conference, Conference B1 2009, can also have a custom SSID entitled "Conference B1 2009" which allows access to the Lobby, Meeting Rooms, Guest Rooms and the Business Center without re-authentication. Similarly, network providers can also have various levels of SSIDs allowing access to different groups of access points where multiple SSIDs correspond to the same access point or zone. Different SSIDs can correspond to different payment levels. For example, an inexpensive SSID access may only grant access to the Lobby, whereas a more expensive SSID can grant access to the Business Center or Meeting Rooms.

In an embodiment, an amount of bandwidth, or maximum bandwidth can be assigned to different access points, groups of access points, zones, groups of zones or custom SSIDs.

The following is a non-limiting example of Zone Migration. As used in this example, a zone is a group of VLAN IDs. When customers connect to the network, for example, at a hotel, they are authenticated in one of four zones:
Lobby/Restaurant/Common Area: 100-150
Guest Wired: 201-700
Guest Wireless: 801-1500
Meeting Room A: 1601-1700

Zone Migration provides the ability to the network to group the VLANS together, meaning that 100-150 would be grouped together, so the user could go from access point 101 in the lobby to access point 125 in the restaurant without being required to re-authenticate. A user would then be required to re-authenticate when moving between the Lobby and Meeting Room A.

Figure 2:
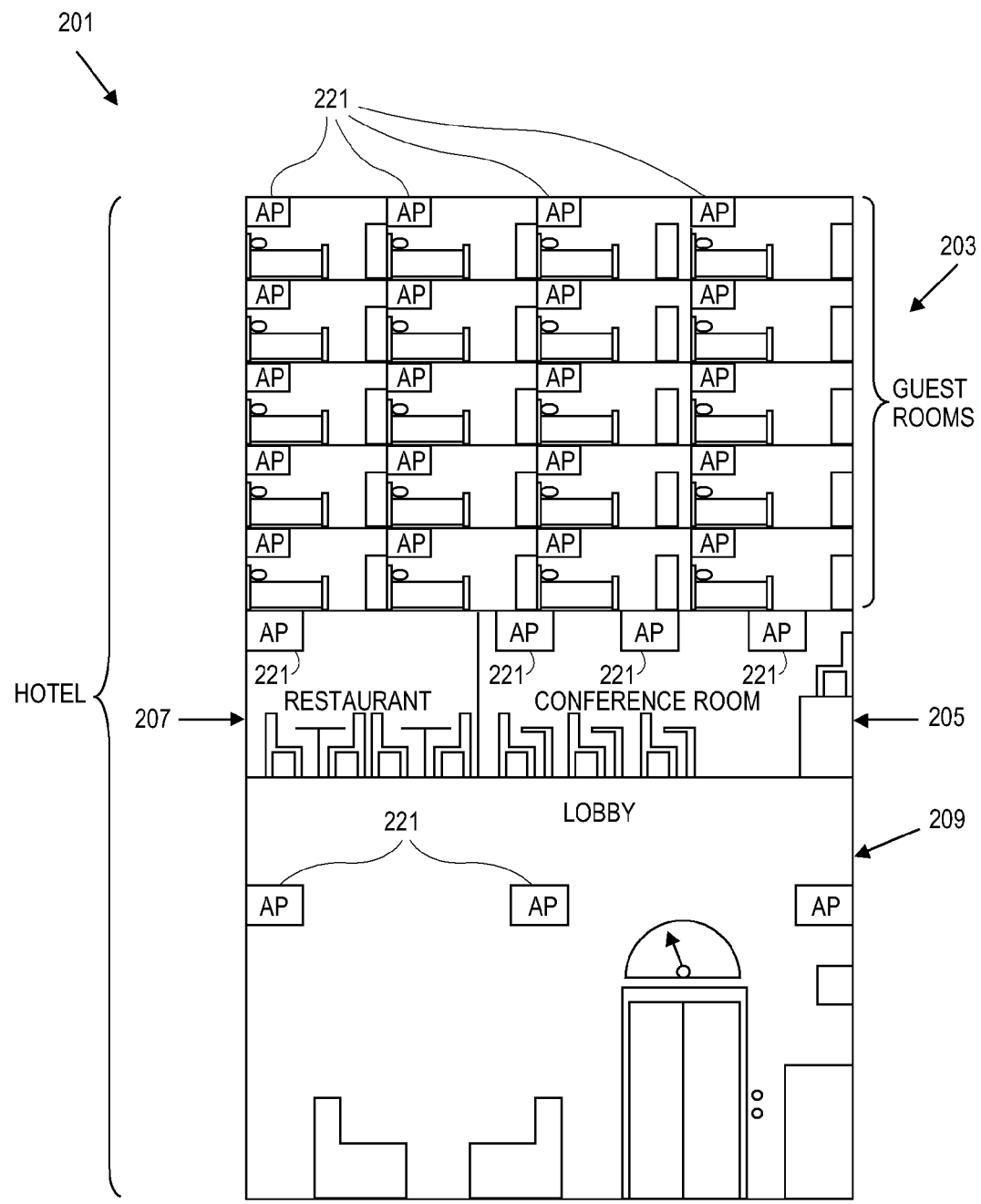
FIG. 2 illustrates a cross section of various access points in a hospitality setting.

FIG. 2 illustrates a cross section of various access points in a hospitality setting. Hotel 201 includes guest rooms 203, conference room 205, restaurant 207 and lobby 209. The guest rooms 203, conference room 205, restaurant 207 and lobby 209 include various access points 221. Although illustrated as having one or more access points in each room, it is to be understood that fewer or more access points can be used. For example, in an embodiment, a single access point can be used for multiple guest rooms. The access points can be configured into various zones. The zones can be defined along room lines or in any other configuration. For example, the access points 221 in the guest rooms 203 area can all be a single zone. Alternatively, access points 221 on a single floor or across less than all floors can also be configured into a zone. As will be understood by a person of skill in the art, zones can be defined along any desired physical locations, incorporating the access points in those physical zones. As will also be understood by those of skill in the art, many different types of facilities will benefit from the present disclosure. For example, although described mainly with respect to hotels, other facilities can use the present access point zone system including schools, colleges, universities, hospitals, government buildings, businesses, or any other public or private networking systems. Also, zones do not need to be restricted to a particular building, but can include multiple buildings.

Figure 3:
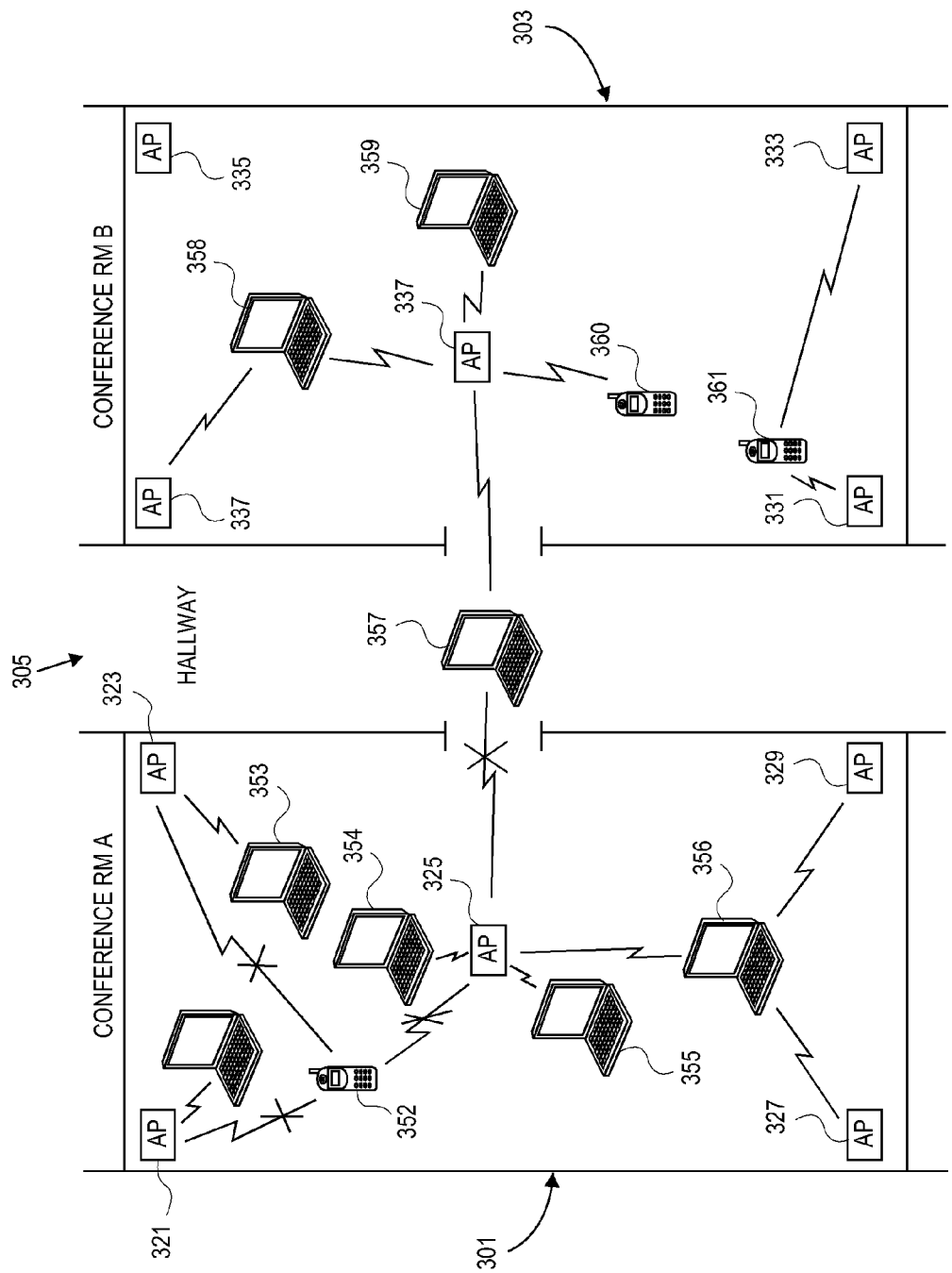
FIG. 3 schematically illustrates access points and network connections of various users in a conference setting.

FIG. 3 schematically illustrates access points and network connections of various users in a conference setting. As illustrated, various user devices, are connected with, attempting to connect with, or are moving between connections with various access points. For example, user device 351 is wirelessly communicating with access point 321. User device 352 is attempting to access the network through access points 321, 323, 325, but has not yet been authenticated and thus is not able to send or receive communications over the network.

Devices are generally programmed to automatically select between access points, by, for example, determining which access point provides the strongest signal. User device 356 is in-between three different access points and is able to communicate with all of them, but will eventually choose one access point to communicate with. In some cases, an access point will not allow a device to communicate through it, in which case the user device will attempt to communicate with another the access point. For example, user device 357 may have the strongest signal with access point 325, but may only be authenticated with access point 337. In this case, the user devices will communicate with access point 337. Of course, as will be understood, user devices can be configured to select access points based on any number of different selection options, including, for example, signal strength, bandwidth availability, access rights, access points corresponding to a particular SSID, etc. When an access point is out of range, a user device will no longer be able to communicate with it and will attempt to find another access point. In an embodiment, switching between access points is seamless, e.g. there is no loss of network session, and a user may not even realize that they have switched access points.

FIG. 4 illustrates an administrator setup screen for defining a plurality of access zones. The setup screen can be an independent computer program or it can run in a web browser. The setup screen provides the ability, as described above, to define zones which include multiple access points (labeled as "Ports-Locations" in FIG. 4). The zone setup information is stored in a database internal or external to the network management device(s) 103 and accessible to the network management device(s) 103. When a user attempts to access the network through an access point, the connection request is sent to the network management device(s) 103 which either allow the access request or deny it based on the programmed information in the database.

A relogin after migration selection 403 is provided to allow an administrator to determine whether to require a user to relogin after migrating between access points. An administrator can enter a zone name as desired in entry area 407. The administrator can then input the ports or locations that correspond to that zone in entry area 409. Optionally, an administrator can provide a description in entry area 411. The administrator can then determine whether a relogin (or reauthentication) will be required for moving between access points within the zone at selection 413. With relogin within zone 413 disabled, a user can freely move between access points without having to relogin. Add zone button 415 provides a subsequent screen which allows an administrator to define another zone. Reset button 417 allows an administrator to reset zone settings. Existing zones section 419 lists all previously defined zones for the network with corresponding ports or locations along with the relogin policy for each zone. To modify an existing zone, the administrator can click on the 'Edit' link of a particular zone. The fields at the top will then be populated with the attributes of the selected zone (name, ports, description and relogin policy). To remove a zone, the administrator can click on the 'Delete' link. A pop-up box will request the confirmation of the delete operation.

In an embodiment, zones cannot overlap, meaning that a port can belong to one and only one zone. In this embodiment, an error will be returned if the administrator enters a new zone that overlaps with an existing zone. In another embodiment, zones can be configured to overlap such that the same port or access location can form part of two or more separate zones.

Many different zone to zone migration policies can be implemented, such as, for example, at the login Portal. In an embodiment, the network can be configured to (1) charge separately for each zone, or (2) allow free migration from "Zone 1" to "Zone 2" after accepting terms and conditions but require a payment when migrating from "Zone 2" to "Zone 1". Similarly, a single payment can be accepted for a group of zones, but an additional or separate charge could be required for other zones.

Zones can also be set up in other interfaces, such as, for example, command line interface (CLI) and simple network management protocol (SNMP). As would be understood by a person of ordinary skill in the art from the present disclosure, the various options and tools available in the interface embodiment of FIG. 4 can be mapped to CLI and SNMP interfaces.

In an embodiment, an unlimited number of zones can be configured. In an embodiment, the number of configurable zones is limited by the capacity of the network equipment used. For example, in an embodiment, up to 64 Zones or up to 32 Zones can be configured.

In an embodiment in which the number of zones is limited, if there is already the maximum number of Zones in the configuration, the network device will return a "Maximum number of Zones already reached" error.

In an embodiment, when a zone is added or modified by the administrator, the network device(s) will check for errors in, such as, for example, the zone name; the specified network access locations, such as, for example, the port assignments;

In an embodiment, the zone name is a string of a specified length, such as, for example, between 1 and 16 characters in length. In an embodiment, if this check fails, the network device(s) will return an "Invalid length of Zone Name" error; the zone description; and/or any other variables.

In an embodiment, the Zone Name must be unique. If this check fails, the network device(s) will return a "Zone Name already in use" error.

In an embodiment, the port name is a string of a specified length, such as, for example, between 1 and 128 characters in length (e.g., enough for at least 20 separate ports, or for at least 10 ranges of ports). The string can contain an individual numeric value (e.g., "211"), or a comma-separated list of numeric values (e.g., "211, 212"), or a range of numeric values with dash-separated delimiters (e.g., "111-799"), or a list of ranges of numeric values (e.g., "100-150, 201-700"), or a comma-separated list of individual numeric values and ranges (e.g., "211, 212, 213-651"). In an embodiment, if the string contains non-numeric values, the NSE will return a "Values may only be numeric, comma separated values or ranges" error.

In an embodiment, the numeric values cannot exceed 65535. When ranges are used, the right delimiter cannot be smaller than the left delimiter. In an embodiment, if these checks fail, the network management device will return an "Invalid format of Ports or value greater than 65535" error.

In an embodiment, ports of different zones cannot overlap. In an embodiment, if this check fails, the network devices will return a "Ports may not overlap ranges in other zones. Modify the overlapping zone first or change this entry" error. In an embodiment, ports are allowed to overlap and this check is not performed.

In an embodiment, the description is a string of specified length, such as, for example, between 0 and 128 characters in length. In an embodiment, if this check fails, the network device(s) will return an "Invalid length of Description" error.

In an embodiment, the relogin is a Boolean value in which no checking is necessary. In some WMI embodiments, the above errors will be shown in a pop-up error box, and in some embodiments, the field causing the error will simultaneously be highlighted with a red border.

There are a number of cases to consider when the zone (e.g. port in some embodiments) of the subscriber changes: (1) If the "Relogin after migration parameter" is disabled, the subscriber does not need to relogin; (2) If the "Relogin after migration parameter" is enabled, and no zone is specified, the subscriber will need to relogin; (3) If the "Relogin after migration parameter" is enabled, and one or more zones are specified, the subscriber may need to relogin when: (1) the port changes to that of a different zone; or (2) the relogin policy of the zone is to require relogin.

In an embodiment, ports that do not belong to any of the configured zone are automatically assigned to a "default Zone". In an embodiment, the absence of a port is also assigned to a "default Zone". The relogin policy of the "default Zone" is simply derived from the "Relogin after migration" parameter. When the subscriber is re-logged in, and a portal is involved in the relogin process, the zone name will also be sent to the portal along with the other portal parameters (MAC address, room number, etc).

In an embodiment, the Administrator setup page also allows the administrator to set up SSID's corresponding to different zones, groups of zones, access points or groups of access points. In an embodiment, SSID's can be programmed to correspond to overlapping access points or zones. For example, a plurality of SSID's can be assigned to the same access point or zone. The Administrator setup page can also provide for temporary (or permanent) custom SSID's corresponding to a plurality of access points or zones. For example, a conference can be set up with a personalized SSID corresponding to a set of access points or zones.

In an embodiment, the Administrator setup page can also allow an administrator to assign an amount of bandwidth to a particular access point, group of access points, zone, group of zones or SSID. For example, the Lobby may be provided less bandwidth than the Guest Rooms. Similarly, a conference with a custom SSID can be provided a set amount of Bandwidth for users of the custom SSID.

Figure 5:
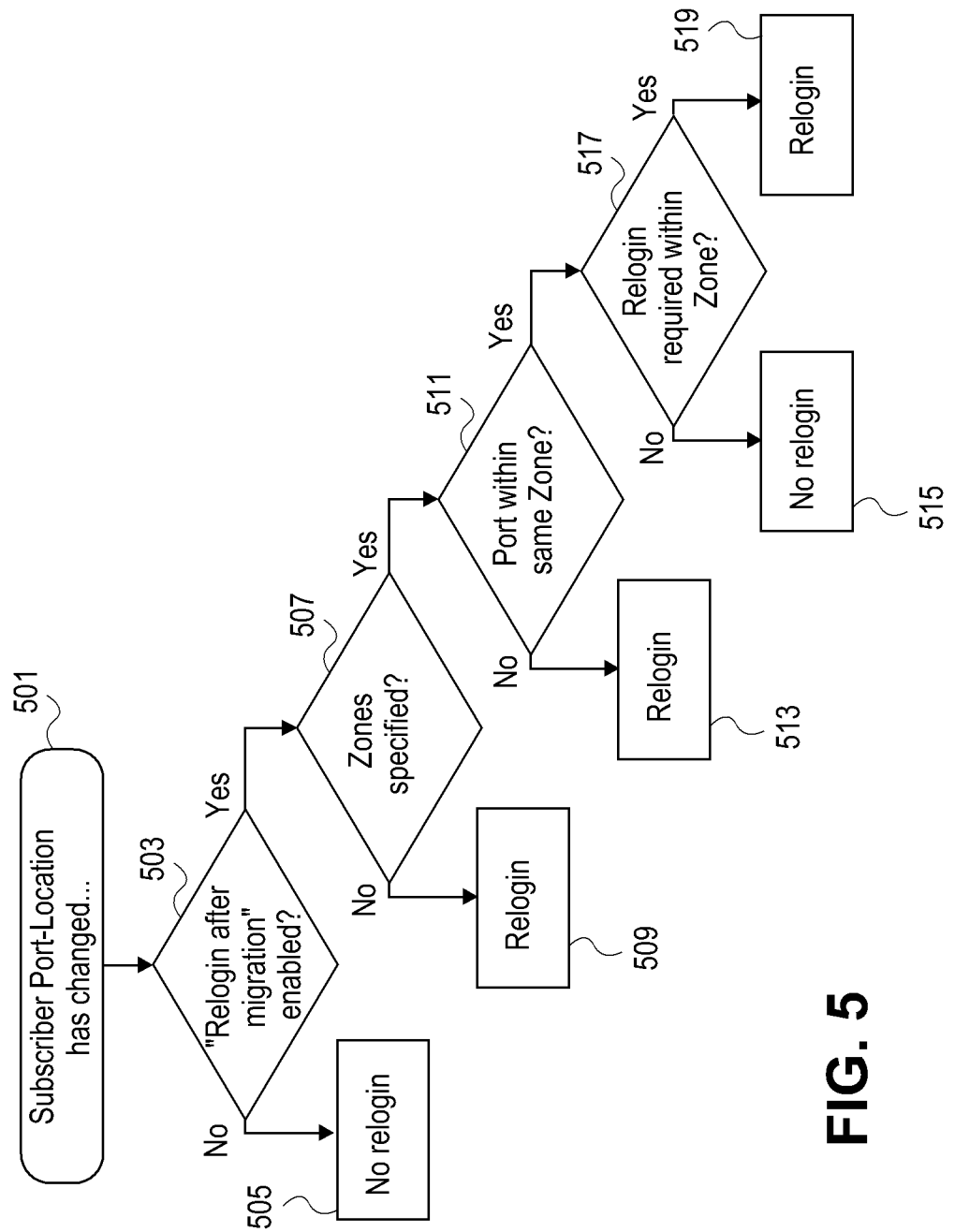
FIG. 5 illustrates a flow chart of a decision tree for determining when a login is required to obtain network access in an embodiment.

FIG. 5 illustrates a flow chart of a decision tree for determining when a login is required to obtain network access in an embodiment. At block 510, a subscriber's access point (labeled as Port-Location) has changed. The system moves to decision block 503 where the system determines whether or not the relogin after migration is enabled. If it is not, then the system allows users to migrate freely between access points at block 505. If the relogin after migration is enabled, then the system moves to decision block 507 where the system determines whether or not zones have been specified. If there are no zones specified then the system will require a relogin at each access point at block 509. If zones have been specified, then the system moves to decision block 511. At decision block 511, the system determines whether the access point, or port in FIG. 5 is within the same zone as the previous access point used by the user. If the answer is no, then a relogin is required at block 513. If the access point is within the same zone, then the system moves to decision block 517. At decision block 517, the system determines whether relogin is required within a zone. If no, then no relogin is required at block 515. If yes, then the user is required to relogin at block 519.

In an embodiment, an administrator can separately define different access rights when moving between zones. For example, in an embodiment, anytime a user moves between zones they are required to login. This type of system is illustrated in FIG. 5. In an embodiment, an administrator can specify that users can move between certain zones without requiring re-authentication while requiring re-authentication when moving to other zones. This type of system is illustrated in FIG. 6.

Figure 6:
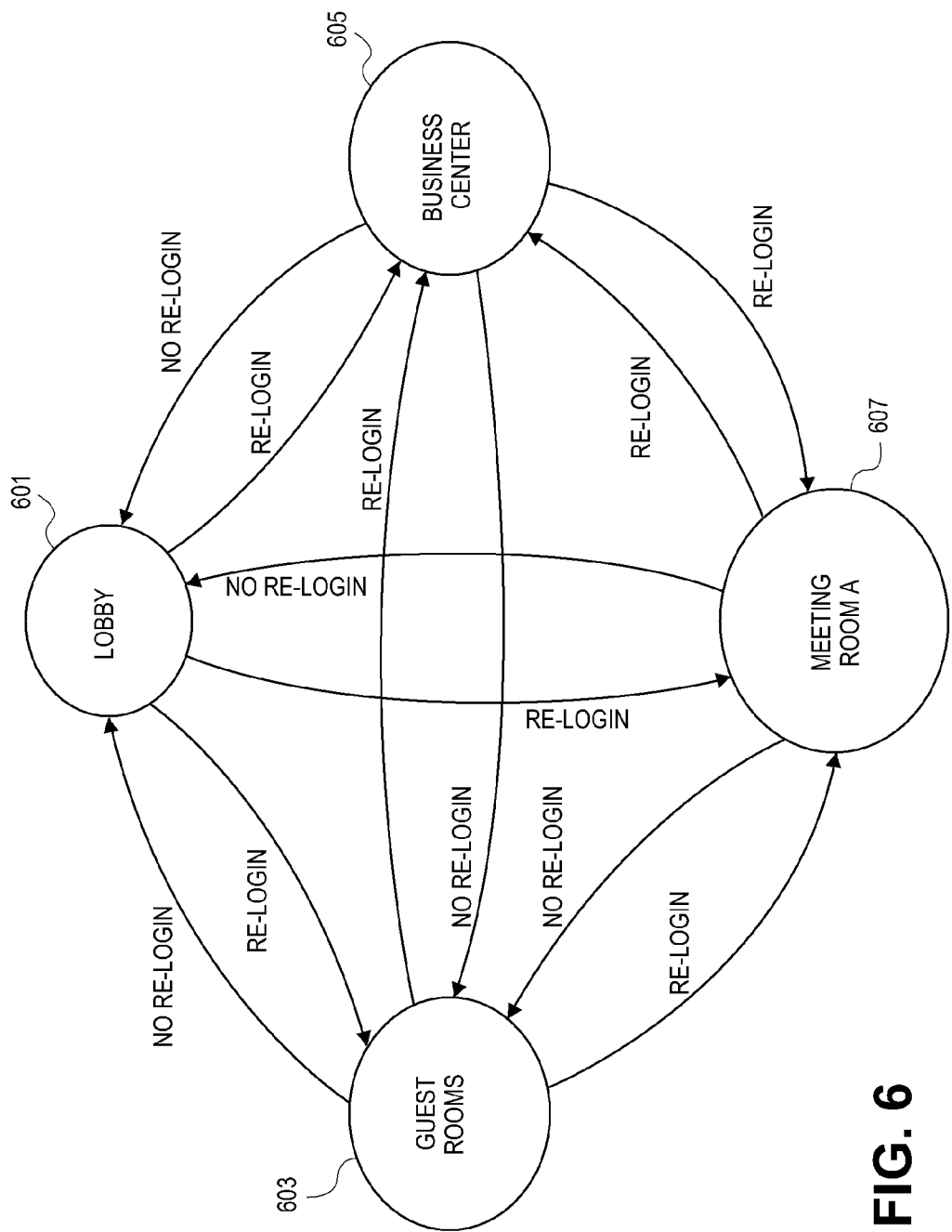
FIG. 6 illustrates a flow chart showing when a login is required when moving between different zones in an embodiment.

FIG. 6 illustrates a flow chart showing when a login is required when moving between different zones in an embodiment. FIG. 6 illustrates four zones, lobby 601, business center 605, guest rooms 603, and meeting room A 607. As illustrated, when a user moves from guest rooms 603 to lobby 601, no relogin is required. When a user moves from lobby 601 to guest rooms 603, a relogin is required. When a user moves between the guest rooms 603 and the business center 605 no relogin is required. When a user moves from the guest rooms to the meeting room A, no relogin is required, but when a user moves from meeting room A to the guest rooms, a relogin is required. When a user moves from meeting room A 607 to the lobby 601, no relogin is required, but when a user moves from the lobby to meeting room A, a relogin is required. When a user moves between the meeting room A and the business center, a relogin is required. When a user moves from the business center 605 to the lobby 601, no relogin is required, but when a user moves from the lobby 601 to the business center 605, a relogin is required. Although FIG. 6 has been described with respect to certain named zones, it is to be understood that any number of zones, zone names, or zone locations can be used with the present system. Also, although described with respect to a relogin, any type of reauthentication can be used to move between zones.

Figure 7:
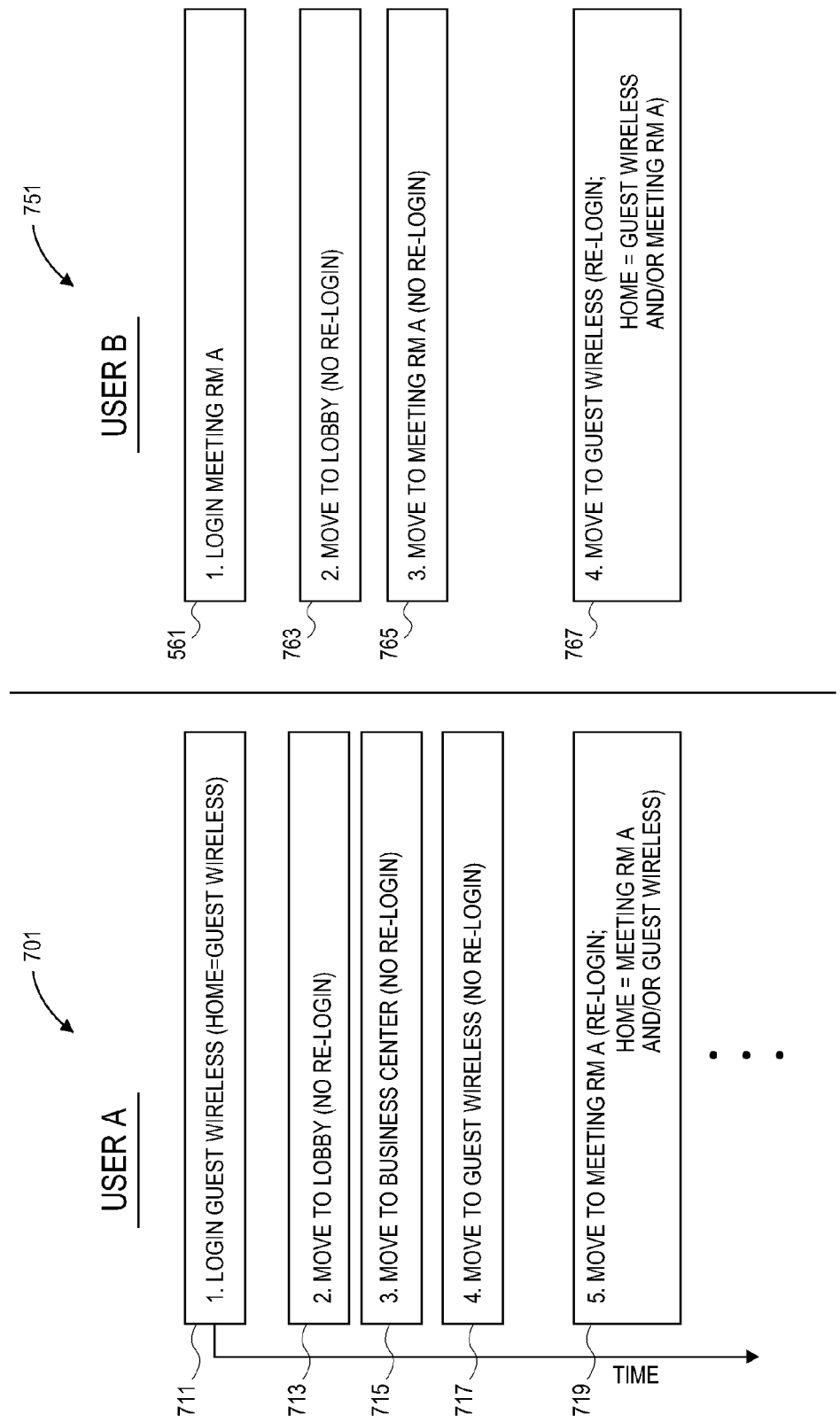
FIG. 7 illustrates a timeline of two examples of users moving between different locations in a network.

In an embodiment, migration between zones can be further configured to use a "home" authentication or initial authentication location to track migration policy. This allows a user, for example, to move from a first zone to a second zone and back to the first zone without a relogin in a system that generally requires a relogin to move from the second zone to the first zone. FIG. 7 illustrates an example timeline of two users moving between different locations in a network which uses a home authentication feature to track migration permission. As illustrated in FIG. 7, User A's 701 initial login is in the guest wireless zone at block 711. The network places into memory User A's initial authentication location and refers back to User A's initial authentication location when to determine migration access rights. User A 701 then moves to the lobby at block 713, then to the business center at block 715 and then back to the guest room at block 717 without relogin. However, when the user moves to meeting room A at block 719, a relogin is required. At this point, the home login can be changed to "meeting room A" or the home login can be both "guest wireless" and "meeting room A" providing permissions to both home authentication permission sets. User B's 751 initial login is the meeting room A at block 761. The user then moves to lobby at block 763 and then back to meeting room A at block 765 without requiring a relogin. However, when the user moves to the guest wireless zone at block 767, a relogin is required. Again, the home login is then altered to either "guest wireless" or both "guest wireless" and "meeting room A."

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While certain embodiments of the inventions disclosed herein have been described, these embodiments have been presented by way of example only, and are not intended to limit the scope of the inventions disclosed herein. Indeed, the novel methods and systems described herein can be embodied in a variety of other forms; furthermore, various omissions, substitutions and changes in the form of the methods and systems described herein can be made without departing from the spirit of the inventions disclosed herein. The claims and their equivalents are intended to cover such forms or modifications as would fall within the scope and spirit of certain of the inventions disclosed herein.

What is claimed is:

1. A method for determining whether to allow a computer communicating with a first network access point within a privately controlled computer network including multiple network access points to migrate from one network access point to another network access point at a different location within the network without re-authentication, the method comprising:

storing migration permissions, at a network management system, for migrating between individual network access points in the plurality of network access points, where the migration permissions establish migration rights between individual network access points in a plurality of network access points, said plurality of network access points configured to provide a computer access to a privately controlled computer network; and determining, at the network management system, whether to require the computer to re-authenticate in order to migrate from communicating with a first network access point in the plurality of network access points to a second network access point in the plurality of network access points based on a subscription level of the computer.

2. The method of claim 1, wherein the subscription level of the computer depends at least on the first network access point.

3. The method of claim 2, wherein the subscription level of the computer depends at least on the location of the first network access point.

4. The method of claim 1, further comprising, sending authentication request to the computer based on the determination.

5. The method of claim 1, wherein the network access point is a port.

6. The method of claim 5, wherein the port is a VLAN port.

7. The method of claim 1, further comprising, receiving instructions for defining a plurality of zones, wherein each zone includes at least one network access point.

8. The method of claim 7, wherein the subscription level of the computer depends at least on the zone of the first network access point.

9. The method of claim 7, wherein at least one SSID is assigned to at least one zone in the plurality of zones.

10. A system for determining whether to allow a computer communicating with a first network access point within a privately controlled computer network including multiple network access points to migrate from one network access point to another network access point at a different location within the network without re-authentication, comprising:

a hardware memory configured to store migration permissions for migrating between individual network access points in the plurality of network access points, where the migration permissions establish migration rights between individual network access points in a plurality of network access points, said plurality of network access points configured to provide a computer access to a privately controlled computer network; and a hardware processor which determines whether to require the computer to re-authenticate in order to migrate from communicating with a first network access point in the plurality of network access points to a second network access point in the plurality of network access points based on a subscription level of the computer.

11. The system of claim 10, wherein the subscription level of the computer depends at least on the first network access point.

12. The system of claim 11, wherein the subscription level of the computer depends at least on the location of the first network access point.

13. The system of claim 10, wherein the hardware processor further sends authentication request to the computer based on the determination.

14. The system of claim 10, wherein the hardware processor further receives instructions for defining a plurality of zones, wherein each zone includes at least one network access point.

15. The system of claim 14, wherein the subscription level of the computer depends at least on the zone of the first network access point.

16. A system for determining whether to allow a computer communicating with a first network access point within a privately controlled computer network including multiple network access points to migrate from one network access point to another network access point at a different location within the network without re-authentication, the method comprising:

means for storing migration permissions for migrating between individual network access points in the plurality of network access points, where the migration permissions establish migration rights between individual network access points in a plurality of network access points, said plurality of network access points configured to provide a computer access to a privately controlled computer network; and means for determining whether to require the computer to re-authenticate in order to migrate from communicating with a first network access point in the plurality of network access points to a second network access point in the plurality of network access points based on a subscription level of the computer.

17. The system of claim 16, wherein the subscription level of the computer depends at least on the first network access point.

18. The system of claim 17, wherein the subscription level of the computer depends at least on the location of the first network access point.

19. The method of claim 16, further comprising, means for sending authentication request to the computer based on the determination.

20. The system of claim 16, further comprising means for receiving instructions for defining a plurality of zones, wherein each zone includes at least one network access point and wherein the subscription level of the computer depends at least on the zone of the first network access point.

* * * * *